United States Patent [19]

Patil

[11] Patent Number: 5,498,673
[45] Date of Patent: Mar. 12, 1996

[54] FUNCTIONAL PARA ALKYLSTYRENE POLYMERS AND COPOLYMERS

[75] Inventor: Abhimanyu O. Patil, Westfield, N.J.

[73] Assignee: Exxon Research & Engineering Co., Florham Park, N.J.

[21] Appl. No.: 346,972

[22] Filed: Nov. 29, 1994

[51] Int. Cl.⁶ ........................................ C08F 8/00
[52] U.S. Cl. .................... 525/333.3; 525/354.3; 525/354.4; 525/383; 525/386
[58] Field of Search ............................ 525/333.3

[56] References Cited

U.S. PATENT DOCUMENTS

| | | | |
|---|---|---|---|
| 2,642,398 | 6/1953 | Butler | 525/333.3 |
| 3,474,159 | 10/1969 | Juveland et al. | 525/333.3 |
| 4,145,490 | 3/1979 | Harris, Jr. et al. | 525/333.3 |

*Primary Examiner*—Bernard Lipman
*Attorney, Agent, or Firm*—Joseph J. Dvorak

[57] ABSTRACT

The present invention provides a functionalized styrenic polymer or copolymer which contains functionalized para-alkystryene moiety having the formula:

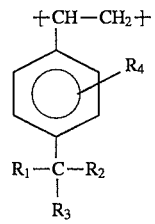

wherein $R_1$, $R_2$, and $R_3$ are independently selected from hydrogen, alkyl and primary and secondary halo alkyl, and $R_4$ is selected from a group having the formula:

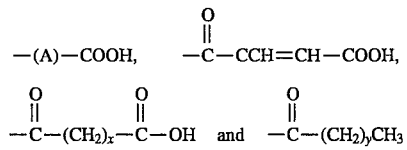

wherein x is an integer of from 2 to about 10, y is an integer from ranging from 0 to about 20 and A is a linear hydrocarbyl group of from 2 to about 10 carbon atoms or a branched hydrocarbyl group of from 3 to about 10 carbon atoms.

8 Claims, No Drawings

FUNCTIONAL PARA ALKYLSTYRENE POLYMERS AND COPOLYMERS

FIELD OF THE INVENTION

This invention relates to functionalized copolymers of para-alkylstyrene and an isoolefin.

BACKGROUND OF THE INVENTION

Styrene containing polymers, especially copolymers of para-alkylstyrene and an isoolefin having from about 4 to 7 carbon atoms are well-known in the art. Indeed, copolymers of para-alkylstyrene and isobutylene are low Tg elastomers which possesses low air permeability, unique damping properties, excellent environmental aging resistance and low surface energy which makes them particularly desirable in many applications. Unfortunately, these polymers also have low reactivity and poor compatibility with most other polymers. Thus there is a need for functionalizing polymers and copolymers containing para-alkylstyrene units with more compatible units for blending.

It is an object of the present invention therefore to functionalize para-alkylstyrene containing polymers with reactive groups which will permit the functionalized polymer to be co-reacted or compatibilized with other polymers by grafting techniques.

SUMMARY OF THE INVENTION

Accordingly, the present invention provides a functionalized styrenic polymer or copolymer which contains functionalized para-alkystyrene moiety having the formula:

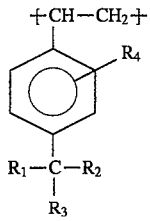

wherein $R_1$, $R_2$, and $R_3$ are independently selected from hydrogen, halide, alkyl and primary and secondary halo alkyl, and $R_4$ is selected from a group having the formula:

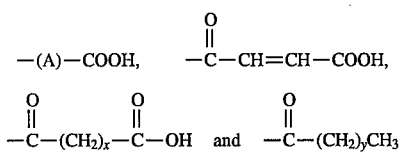

wherein x is an integer of from 2 to about 10, y is an integer from ranging from 0 to about 20, and A is a linear hydrocarbyl group of from 2 to about 10 carbon atoms or a branched hydrocarbyl group of from 3 to about 10 carbon atoms.

The novel copolymers of the present invention have particular utility in forming polymer blends. For example, the acid functionalized polymer can be used as a compatabilizer by reacting it with a polyol, polyamine or the like.

DETAILED DESCRIPTION OF THE INVENTION

Polymers containing para-alkylstyrene may be functionalized in accordance with the process of the present invention. Particularly suitable para-alkystyrene containing polymers for functionalization are copolymers of an isoolefin having from about 4 to 7 carbon atoms and a para-alkylstyrene moiety represented by the formula

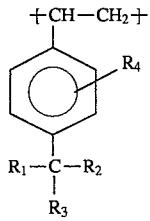

wherein $R_1$, $R_2$, and $R_3$ are independently selected from hydrogen, halide, alkyl and primary and secondary halo alkyl groups. In the practice of the present invention, however, it is particularly preferred to use a copolymer of isobutylene and para-methyl styrene.

The foregoing polymers are functionalized by reacting the para-alkylstyrene containing polymer or copolymer with an acid anhydride, acylhalide or lactone in the presence of a Lewis acid.

Particularly useful anhydrides include succinic, maleic and phthalic anhydrides.

Particularly useful acylhalides include acetyl, isobutyryl, and propionyl halides, especially chloride.

Particularly useful lactones include gamma-butyrolactone, beta-butyrolactone, alpha-methyl-gamma-butyrolactone, beta-methyl-gamma-butyrolactone, gamma-valerolactone, delta-valerolactone, epsilon-caprolactone.

Any Lewis acid catalyst can be used in preparing the functionalized para-alkylstrene containing polymers; however, the preferred Lewis acid catalysts are based on metals such as boron, aluminum, gallium, indium, titanium, zirconium, tin, arsenic, antimony and bismuth. Especially preferred are the halide containing compounds of the foregoing metals such as boron trifluoride, aluminum trichloride, aluminum dichloride and the like.

Typically, the functionaliztion will be carried out in the presence of a hydrocarbon diluent such as aliphatic or aromatic hydrocarbons or in the presence of a polar solvent such as carbon disulfide, nitrobenzene, methylene chloride, 1, 2 dichloroethane and the like. It is particularly preferred in the practice of the present invention to carry out the process in the presence of a solvent.

The functionalization of the polymers typically is carried out at temperatures of from about −50° C. to about 100° C., for times sufficient to add the functional group, i.e., the alkyl carbonyl, alkyl or alkenyl carboxylic acid, to the aromatic ring of the para-alkylstyrene containing polymer.

The ratio of acylhalide, acid anhydride, or lactone to the styrenic units in the para-alkylstrene containing polymer can vary widely. In general, however, from about 0.01 to 10 mols of acylhalide, acid anhydride or lactone per 1 mols of styrenic moieties in the para-alkylstrene containing polymer will be employed.

In general, the acylhalide will have from 2 to about 14 carbon atoms, the acid anhydride will have from 4 to about 12 carbon atoms; and the lactone used will have from 3 to about 11 carbon atoms.

The following examples illustrate the invention:

EXAMPLE 1

The copolymer of para-methylstyrene and isobutylene utilized in this example contained 15.0 wt. % para-methylstyrene, remaining being isobutylene. The copolymer had a weight average molecular weight (Mw) of 377,500 and a number average molecular weight (Mn) of 149,600 with polydispersity of 2.52.

5.00 grams of copolymer was dissolved in 50 ml. dichloromethane in a 3 neck flask equipped with condenser, nitrogen bubbler and a dropping funnel. 0.64 g of succinic anhydride was then added and the solution was stirred at room temperature for one hour under nitrogen. 1.70 gms $AlCl_3$ was added and the mixture stirred at room temperature for 6 hours. The colorless, viscous solution turned viscous red-brown in 5 minutes after the $AlCl_3$ addition. The product was precipitated by adding the reaction mixture to 200 ml of acetone. The product was stirred with 200 ml. of 0.1N dil. HCl for one hour, filtered, washed with 200 ml. water and then with 100 ml. acetone. The product was dried under vacuum.

The infrared spectrum of the product was similar to the starting polymer with additional peaks due to carboxylic and carbonyl functionality. The infrared spectrum of the product showed a broad peak at 3500–3000 $cm^{-1}$ due to carboxylic acid group and two characteristics carbonyl peaks a sharp peak at 1690 $cm^{-1}$ and a broad peak at 1630 $cm^{-1}$.

EXAMPLE 2

3.00 grams of copolymer of para-methylstyrene and isobutylene which contains 15.0 wt. % para-methylstyrene as discussed in Example-1, was dissolved in 20 ml dichloromethane in a 3 neck flask equipped with condenser, nitrogen bubbler and a dropping funnel. 0.38 g of maleic anhydride was then added and the solution was stirred at room temperature for 30 minutes under nitrogen. 1.00 gm $AlCl_3$ was added and the mixture was stirred at room temperature for 1 hour. The colorless, viscous solution turned viscous red-brown immediately after the $AlCl_3$ addition. The product was isolated by adding the reaction mixture to 100 ml. methanol. The product was washed with acetone and then dired under vacuum.

The infrared spectrum of the product was similar to a starting polymer with additional peaks due to carboxylic acid and carbonyl functionality. The infrared spectrum of the product showed a broad peak at 3500–3000 $cm^{-1}$ due to carboxylic acid group and two characteristics carbonyl peaks at 1707 $cm^{-1}$ and at 1674 $cm^{-1}$.

EXAMPLE 3

5.00 grams of copolymer of para-methyl styrene and isobutylene which contains 15.0 wt. % para-methylstyrene as discussed in Example-1, was dissolved in 50 ml. dichloromethane in a 250 ml 3 neck flask equipped with condenser, nitrogen bubbler and a dropping funnel. 1.70 gms $AlCl_3$ was added and 1 gram of acetyl-1-$^{13}C$ chloride was added at room temperature under nitrogen. The solution was stirred at room temperature for 6 hours. The colorless, viscous solution turned viscous red-brown in 5 minutes after the $AlCl_3$ addition. The product was precipitated by adding the reaction mixture to 200 ml of acetone water mixture (50:50). The product was washed with acetone and was dried under vacuum.

The infrared spectrum of the product showed a characteristic peak at 1647 $cm^{-1}$ due to carbonyl of the functionalized polymer.

EXAMPLE 4

The copolymer of the para-methylstyrene and isobutylene utilized in this example contained 15.0 wt % para-methylstyrene, remaining being isobutylene. The copolymer has a weight average molecular weight (Mw) of 377,500 and a number average moecular weight (Mn) of 149,600 polydispersity (Mw/Mn) of 2.52.

3.00 grams of copolymer was dissolved in 50 ml. dichlorobenzene in a 3 neck flask equipped with condenser, nitrogen bubbler and a dropping funnel. 0.75 grams gamma-butyrolactone was then added and the solution was stirred at room temperature for one hour under nitrogen. 2.00 grams of $AlCl3$ was added and the mixture stirred at room temperature. Immediately product turned dark red. The product was precipitated after 15 minutes, by adding the reaction mixture to 200 ml. of acetone/methanol mixture (50:50). The product was stirred with 200 ml. of water, decanted, washed with 200 ml. acetone. The product was dried under vacuum. The infrared spectra of the product showed a broad peak at 3500–3000 $cm^{-1}$ due to carboxylic acid group.

EXAMPLE 5

This example illustrates the ability to react functionalized polymer of this invention with an alcohol containing compound.

1.00 grams of acid functionalized copolymer as prepared by the procedure described in the Example-1 was dissolved in 25 ml. toluene in a 3 neck 100 ml flask equipped with condenser, nitrogen bubbler and a dropping funnel. 25 ml. ethyl alcohol was added and then was added 2 ml. of concentrated sulfuric acid. The solution was heated in oil bath, with bath temperature of 85° C. for six hours under nitrogen. The product was isolated by adding the reaction mixture to 200 ml. of water. The product was washed with water three times and then with acetone. The product was dried under vacuum.

The infrared spectrum of the product showed disappearance of a broad peak at 3500–3000 $cm^{-1}$ due to carboxylic acid group and new characteristics ester peaks at 1738 $cm^{-1}$ and 1718 $cm^{-1}$ along with carbonyl peak at 1690 $cm^{-1}$. Gel permeation chromatography (GPC) analysis in THF solution, using ultraviolet (UV) and refractive index (RI) detectors of a resultant ester functionalized copolymer showed that, the functionality with paramethylstyrene is quite uniformly distributed over the entire molecular weight range. The $^{13}C$ NMR of the product ester showed two carbonyl peaks at 173 ppm and 202 ppm due to ester and ketone carbonyl respectively.

What is claimed:

1. A functionalized para-alkylstyrene polymer or copolymer which contains randomly located in the polymeric chain monomeric units of the formula:

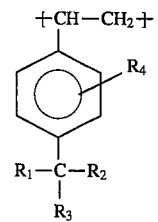

wherein $R_1$, $R_2$, and $R_3$ are independently selected from the group consisting of hydrogen alkyl, and primary and secondary halo alkyl, and $R_4$ is selected from the group consisting of

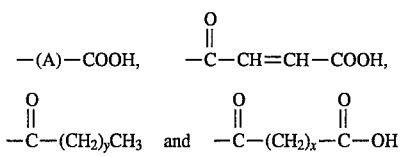

wherein x is an integer of from 2 to about 10, y is an integer of from 0 to about 20 and A is a linear hydrocarbyl group of from 2 to about 10 carbon atoms or a branched hydrocarbyl group of from 3 to about 10 carbon atoms.

2. The functionalized polymer of claim 1 wherein the para-alkylstyrene polymer is a copolymer of para-alkylstyrene and an isoolefin from about 4 to about 7 carbon atoms.

3. The functionalized copolymer of claim 2 wherein $R_4$

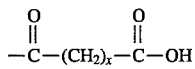

4. The funtionalized copolymer of claim 2 wherein $R_4$

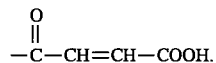

5. The functionalized copolymer of claim 2 wherein $R_4$ is —(A)—COOH

6. The functionalized copolymer of claim 2 wherein $R_4$

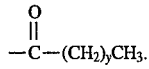

7. A functionalized polymer of an isoolefin having from about 4 to about 7 carbon atoms and a para-alkylstyrene, wherein the the para-alkyl styrene is represented by the formula

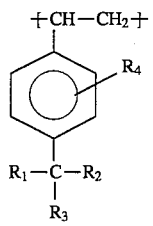

and the functionalized para-alkylstyrene moiety is represented by the formula:

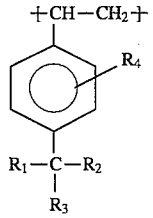

wherein $R_1$, $R_2$, and $R_3$ are independently selected from group hydrogen alkyl, and primary and secondary halo alkyl, and $R_4$ is selected from the group consisting of:

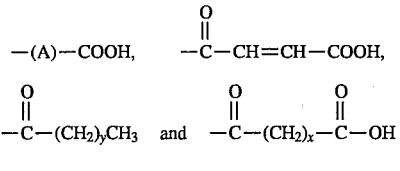

wherein x is an integer of from 2 to about 10, and y is an integer of from about 0 to about 20, and A is a linear hydrocarbyl group of from 2 to about 10 carbon atoms or a branched hydrocarbyl group of from 3 to about 10 carbon atoms.

8. The functionalized polymer of claim 7 wherein the isoolefin is isobutylene and $R_1$, $R_2$, and $R_3$ are hydrogens.

* * * * *

UNITED STATES PATENT AND TRADEMARK OFFICE
CERTIFICATE OF CORRECTION

PATENT NO. : 5,498,673
DATED : March 12, 1996
INVENTOR(S) : Abhimanyu O. Patil

It is certified that error appears in the above-indentified patent and that said Letters Patent is hereby corrected as shown below:

In column 6, lines 1 through 10 change:

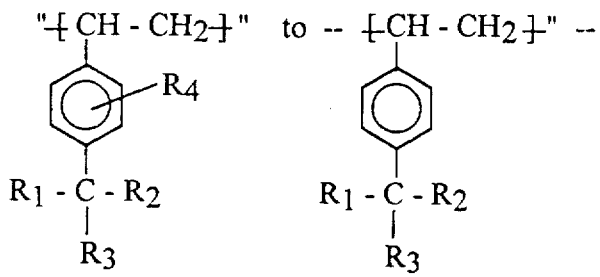

Signed and Sealed this

Thirteenth Day of May, 1997

Attest:

BRUCE LEHMAN

Attesting Officer  Commissioner of Patents and Trademarks